UNITED STATES PATENT OFFICE.

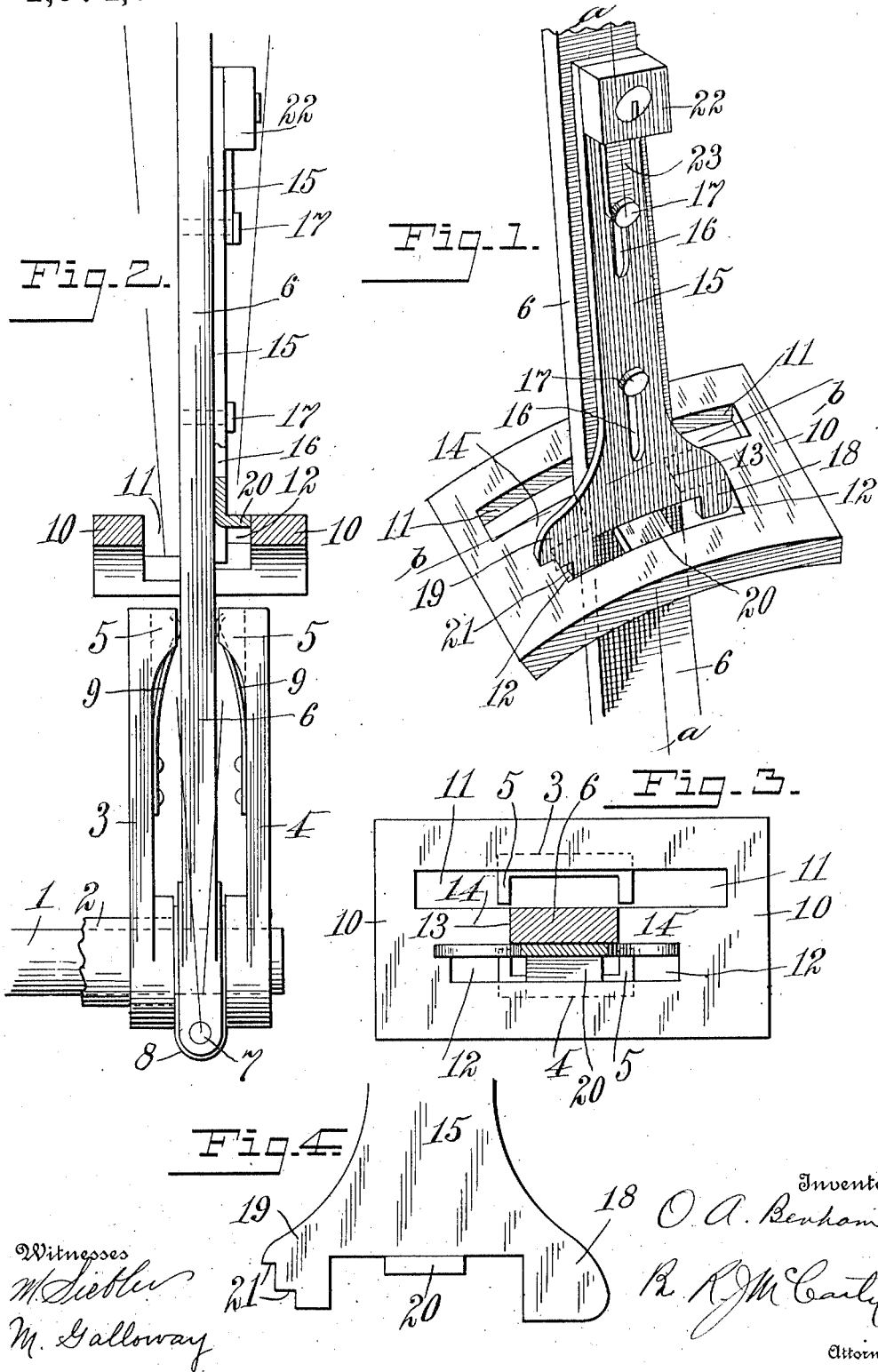

OLIVER A. BENHAM, OF DAYTON, OHIO.

LEVER-LOCK.

1,074,038.

Specification of Letters Patent. Patented Sept. 23, 1913.

Application filed December 23, 1912. Serial No. 738,130.

*To all whom it may concern:*

Be it known that I, OLIVER A. BENHAM, a citizen of the United States, residing at Dayton, in the county of Montgomery and State of Ohio, have invented certain new and useful Improvements in Lever-Locks; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain improvements in locks for securing the gear shifting lever of automobiles. In briefer terms, it may be defined as a lever lock.

The object of the invention is to provide a simple locking device which may be utilized in connection with the gear shifting levers of a variety of different automobiles.

To these ends, the locking device consists of a sliding member which is mounted upon the shifting lever and is movable relative to the H-plate and when moved in operative relation with the latter, its position is such as to lock the shifting lever against movement in any direction.

Preceding a detailed description of my invention, reference is made to the accompanying drawings of which—

Figure 1 is a perspective view of a portion of a shifting lever, and an H-plate showing the device in operative relation; Fig. 2 is a cross-section through the H-plate at a right angle to Fig. 1 showing the shifting lever connected with the rock shaft which connects the transmission gears (not shown); Fig. 3 is a top plan view of the H-plate showing the shifting lever and locking plate in section, on the line b—b of Fig. 1; Fig. 4 is an enlarged elevation of the lower end of the locking plate.

In a detailed description of the invention, similar reference characters indicate corresponding parts.

6 designates the usual form of lever through which the transmission gears of an automobile are controlled. In the present application of the mechanism, illustrated in the drawing, the lower end of said lever is of a well known bifurcated form and straddles the rock shaft 1 and is clamped thereon by a bolt 7 which penetrates an aperture in the said lower bifurcated end 8 of the lever. 2 designates a portion of a tube inclosing said lever and leading to the arm on the inside of the transmission. These are well known features of automobile transmission control and need no illustration. On each side of the connected end of the lever 6 are arms 3 and 4 which are journaled upon the rock shaft 1 and the upper ends of which are enlarged as at 5 for the purpose of holding the said lever in its neutral position as shown in Figs. 2 and 3. Springs 9 are secured on the inner sides of the arms 3 and 4 and these engage the opposite sides of the lever directly. The H-plate 10 is of well known form and construction, having the usual slots 11, 12 and 13 into which the shifting lever is movable. For example, the slot 11 is that in which the lever may be moved in obtaining low speed or reverse movement, and the slot 12 is that in which the lever may be moved in obtaining high speed and intermediate. The slot 13, which is provided by extending the portions 14, provides the neutral position for said shifting lever. In this position, the said lever may be locked by means of a slidable plate 15 which is mounted upon said lever in juxtaposition to the H-plate. This slidable plate 15 is provided with elongated slot 16 through which head bolts pass, said bolts being secured to the lever. The lower end of said locking plate 15 is enlarged to provide a projection 18 and two or more projections 19 and 21. Extending substantially lateral to the plane of the lever and from the lower end thereof, is a lip 20. When the lower end of said plate is lowered into a locking position in the H-plate, as shown in the drawings, the projections 18 and 21 are adjacent to the end walls of the slot 12 while the lip 20 engages the outer side wall of said slot or opening 12. The H-plate, as shown in Fig. 1, has an opening 12 which is of a size to permit the projection 21 to enter it, therefore, the projections 18 and 21 are instrumental in preventing any movement of the lever 6 lengthwise of the H-plate, while the lip 20 prevents any lateral movement of said lever in one direction and the projections 18 and 21 prevent any lateral movement of the lever in the opposite direction by the extended portions 14 of said H-plate. This is clearly shown in Fig. 3, where it will be seen that the lever 6 is in the neutral slot 13 and the lower end of the locking plate 15 is in the high speed and intermediate speed slot 12 with the lip 20 engaging the outer wall of said slot and the projections 18 and 21 engaging the portions 14 between which the lever 6 lies. In the event a particular H-plate should have a longer high speed and intermediate speed slot 12, the projection 19 of the locking plate 15 will enter said slot and coöperate with the projection 18 in preventing any movement of the lever lengthwise of said H-plate.

As I have said before, the purpose and object of my locking device is that the same shall be adapted to lock the shifting levers of any of the well known types of automobile transmission gear which employ H-plates. Some of these have the spaces in which the lever is movable to a greater extent than others. Therefore, I have provided the engaging end of the locking plate 15 with a multiplicity of projections so as to be operative with any of these well known forms of H-plates. It will be readily seen that when the shifting lever 6 is locked, it is rigidly held in such locking position, as no movement can be imparted to the same in either direction. This I have clearly indicated in the above description. Of course, it will be understood that when the slidable locking plate 15 is elevated from the H-plate, the shifting lever may be freely manipulated and at all times the locking plate 15 is maintained thereon and is inseparable therefrom. The possibility of its being lost or misplaced is, therefore, not a problem. I provide means for locking the plate 15 either in a locking position or in an elevated position. This consists of a well known type of lock 22 which is rigidly mounted upon the open end of said plate 15. The bolt or plunger 23 of this lock is extended and is movable through the insertion of the key and the same is connected to the upper bolt 17 by penetrating the end of said plunger. It will, therefore, be readily seen that when the plunger is retracted by turning the key within the lock, the slidable plate 15 will be moved to the locking position shown in the several views, and, when said bolt or plunger is extended, the locking plate will likewise be elevated above the H-plate and will be maintained in such position until lowered, which act takes place whenever it is desired to lock the shifting lever against operation. It will be readily understood how this locking plate 15 is thus manipulated to secure it in either a lowered or elevated position.

While I have described my invention with some particularity, I do not wish to limit the same to parts that may be varied more or less without affecting the scope of the invention. For example, the sliding plate 15 coöperates with four adjacent sides of the H-plate when moved in operative relation to said H-plate. The engaging end of the locking plate may be more or less varied without affecting this function, therefore, I do not wish to limit myself to the identical form shown and described but rather I wish to embrace within the scope of the claims all modifications which do not depart from the essential and fundamental parts of my invention.

Having described my invention, I claim:

1. In a locking device for transmission control levers, the combination with a gear shifting lever and an H-plate in which said lever is confined, of a locking plate slidably mounted on a side of said lever and having an enlarged end provided with a series of engaging shoulders whereby said locking plate is adapted to interlock said lever with different H-plates, a side projection on said locking plate adapted to lock said lever from lateral movement, and a lock for securing said plate in position, substantially as specified.

2. In a lock for transmission levers of automobiles, the combination with a lever and an H-plate having guide slots to the extent of which said lever is movable, of a slidable plate having an enlarged end mounted upon said lever and movable in the slots of said H-plate, the enlarged end of said slidable plate being provided with a series of engaging shoulders adapted to coöperate with H-plates of varying lengths of slots to prevent said lever being moved in a plane parallel with the length of the H-plate, and a projection on said plate adapted to engage said H-plate to prevent lateral movement of the lever relative thereto, and means such as a lock for locking said slidable plate in position.

In testimony whereof I affix my signature, in presence of two witnesses.

OLIVER A. BENHAM.

Witnesses:
R. J. McCarty,
Matthew Siebler.